(12) United States Patent
LeBlanc (10) Patent No.: US 8,520,519 B2
(45) Date of Patent: Aug. 27, 2013

(54) EXTERNAL JITTER BUFFER IN A PACKET VOICE SYSTEM

(75) Inventor: Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 2655 days.

(21) Appl. No.: 10/427,807

(22) Filed: May 1, 2003

(65) Prior Publication Data

US 2004/0057445 A1 Mar. 25, 2004

Related U.S. Application Data (60) Provisional application No. 60/412,276, filed on Sep. 20, 2002.

(51) Int. Cl.
*H04J 3/14* (2006.01)

(52) U.S. Cl.
USPC .............. 370/232; 370/412; 370/428; 710/52

(58) Field of Classification Search
USPC ............ 370/229–32, 351, 52, 55, 389.91–92, 370/412, 28, 471, 72, 516, 519
See application file for complete search history.

(56) References Cited

U.S. PATENT DOCUMENTS

| 4,914,650 A * | 4/1990 | Sriram ........................... 370/235 |
| 5,557,604 A | 9/1996 | Usumi et al. |
| 5,615,214 A * | 3/1997 | Chandos et al. .............. 370/349 |
| 5,640,388 A * | 6/1997 | Woodhead et al. ........... 370/468 |
| 5,758,076 A * | 5/1998 | Wu et al. ........................ 709/231 |
| 5,966,387 A * | 10/1999 | Cloutier ......................... 370/516 |
| 6,157,653 A | 12/2000 | Kline et al. |
| 6,219,339 B1 * | 4/2001 | Doshi et al. .................... 370/235 |
| 6,452,950 B1 * | 9/2002 | Ohlsson et al. ................ 370/516 |
| 6,507,592 B1 * | 1/2003 | Hurvig et al. .................. 370/503 |

(Continued)

FOREIGN PATENT DOCUMENTS

| DE | 42 17 911 | 12/1993 |
| DE | 44 17 286 | 11/1995 |
| EP | 0 485 971 | 5/1992 |
| WO | 99/23776 | 5/1999 |

OTHER PUBLICATIONS

European Search Report for European Patent Application No. 03021403.5-1237, dated Jan. 19, 2010.

(Continued)

*Primary Examiner* — Andrew Lai
*Assistant Examiner* — Leon Andrews
(74) *Attorney, Agent, or Firm* — Thomas | Horstemeyer, LLP.

(57) ABSTRACT

A packet voice communication system having a jitter buffer external to a voice processor. The jitter buffer stores voice packets received from a packet network. The voice processor processes the voice packets from the jitter buffer. A jitter buffer processor may place an indicator in each voice packet it holds. The indicator can indicate a length of time the voice packet was held. The rate at which packets come from the jitter buffer may be based upon the indicator, a higher rate if holding times are high and a slower rate if low. The voice processor can store the voice packets in a packet queue prior to processing the voice packets. The rate voice packets come to the voice processor may be based upon how full the packet queue is, a higher rate if the packet queue is relatively empty and a slower rate if relatively full.

20 Claims, 7 Drawing Sheets

(56) References Cited

U.S. PATENT DOCUMENTS

| | | | |
|---|---|---|---|
| 6,549,587 B1* | 4/2003 | Li | 375/326 |
| 6,580,694 B1* | 6/2003 | Baker | 370/252 |
| 6,707,821 B1* | 3/2004 | Shaffer et al. | 370/395.4 |
| 6,748,000 B1* | 6/2004 | Vainikainen et al. | 370/517 |
| 2002/0026310 A1* | 2/2002 | Mochida et al. | 704/201 |
| 2002/0051460 A1* | 5/2002 | Galbi et al. | 370/412 |
| 2002/0064158 A1* | 5/2002 | Yokoyama et al. | 370/394 |
| 2002/0064186 A1* | 5/2002 | Aoyagi et al. | 370/521 |
| 2003/0035371 A1* | 2/2003 | Reed et al. | 370/230 |
| 2004/0076191 A1* | 4/2004 | Sundqvist et al. | 370/516 |

OTHER PUBLICATIONS

Montgomery, "Techniquest for Packet Voice Synchronization." IEEE Journal on Selected Areas in Communications, vol. SAC-01, No. 6, Dec. 1, 1983, XP000563228.

* cited by examiner

EXTERNAL JITTER BUFFER IN A PACKET VOICE SYSTEM

REFERENCE TO RELATED APPLICATIONS

This application claims the benefit of U.S. Provisional Application No. 60/412,276, entitled "EXTERNAL JITTER BUFFER IN A PACKET VOICE SYSTEM" and filed on Sep. 20, 2002, which is hereby expressly incorporated herein by reference.

BACKGROUND OF THE INVENTION

The present invention relates generally to telecommunications systems, and more particularly, to a packet-based system having a jitter buffer external to a voice processor.

Global and local communication systems are rapidly changing from switched network systems to packet network systems. Packet network systems transmit data, speech, and video. Examples of a packet network are the Internet (a globally connected packet network system) and intranets (a local area packet network system). While speech communication in switched network systems is carried by a direct point-to-point connection, speech communication in packet network systems is performed by packing speech frames and transmitting the frames over the network.

Irregularity (or jitter) in the time of arrival of transmitted packets can jeopardize the quality of speech transmitted by a packet network. Since speech communications is a continuous process, each packet should be available at the receiving end in time for its usage (a packet is used by decoding its content and playing the decoded speech to the listener). Congestion due to inadequate bandwidth often leads to long delays in the delivery of time-sensitive packets. A problem arises, for example, if a few packets are delayed at a node of the packet network. At the receiving end, since the speech packets have not arrived, the listener will experience a discontinuity in speech. Moreover, when the packets finally arrive to their destination, they might arrive too late to be used, and will be dropped. In this case, the listener will lose some of the information. For voice data, packets that are lost or discarded result in gaps, silence, and clipping in real-time audio playback.

One possible solution for the irregular time of arrival of speech packets has been the buffering of several speech packets before using them to produce the speech. The speech packets are put in a FIFO (First-In-First-Out) buffer type, which holds several packets. Such a buffer is commonly called a jitter buffer. If the number of delayed packets is less than the size of the buffer, then the buffer will not become empty, and the listener will not experience speech discontinuity or loss. The greater the potential jitter, the larger the buffer has to be, in order to give more room for the playback of previous packets while waiting for the subsequent arrival of later packets. Some existing voice data processors incorporate an internal jitter buffer that shares the same processor with other voice processing functions. It is desirable to implement a voice processing system that has a jitter buffer that has enough memory to accommodate large amounts of jitter and yet is relatively inexpensive to manufacture.

Further limitations and disadvantages of conventional and traditional approaches will become apparent to one of skill in the art through comparison of such systems with the present invention, as set forth in the remainder of the present application with reference to the drawings.

BRIEF SUMMARY OF THE INVENTION

One aspect of the present invention is directed to a packet voice communication system having a voice processor and a jitter buffer external to the voice processor. The external jitter buffer receives voice packets from a network and holds the received voice packets. The voice processor synchronously retrieves voice packets from the external jitter buffer and processes the retrieved voice data packets. The external jitter buffer places an indicator in each of the packets it holds, the indicator being indicative of how long the voice packet was held in the jitter buffer.

Another aspect of the present invention is directed to a method of operating a packet voice communication system. According to the method, a voice packet is received from a network and held in an external jitter buffer external to a voice processor. An indicator is placed in the voice packet, the indicator being indicative of how long the voice packet was held in the external jitter buffer. The voice packet, including the indicator, is retrieved from the external jitter buffer and processed by the voice processor.

Another aspect of the present invention is directed to a packet voice communication system having a voice processor and a jitter buffer external to the voice processor. The external jitter buffer receives voice packets from a network, holds the received voice packets, and synchronously provides the voice packets to the voice processor. The voice processor receives the voice packets in a packet queue and processes the received voice packets. The voice processor notifies the external jitter buffer of how many voice packets are in the voice processor's packet queue.

Another aspect of the present invention is directed to a method of operating a packet voice communication system. According to the method, a voice packet is received from a network and held in a jitter buffer external to a voice processor. The received voice packet is transferred from the external jitter buffer to a packet queue in the voice processor and the voice packet is processed by the voice processor. The external jitter buffer is notified of how many voice packets are in the voice processor's packet queue.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In an illustrative embodiment of the present invention, a signal processing system is employed to interface voice telephony devices with packet-based networks. Voice telephony devices include, by way of example, analog and digital phones, ethernet phones, Internet Protocol phones, interactive voice response systems, private branch exchanges (PBXs) and any other conventional voice telephony devices known in the art. The described preferred embodiment of the signal processing system can be implemented with a variety of technologies including, by way of example, embedded communications software that enables transmission of voice data over packet-based networks. The embedded communications software is preferably run on programmable digital signal processors (DSPs) and is used in gateways, remote access servers, PBXs, and other packet-based network appliances.

Figure 1:
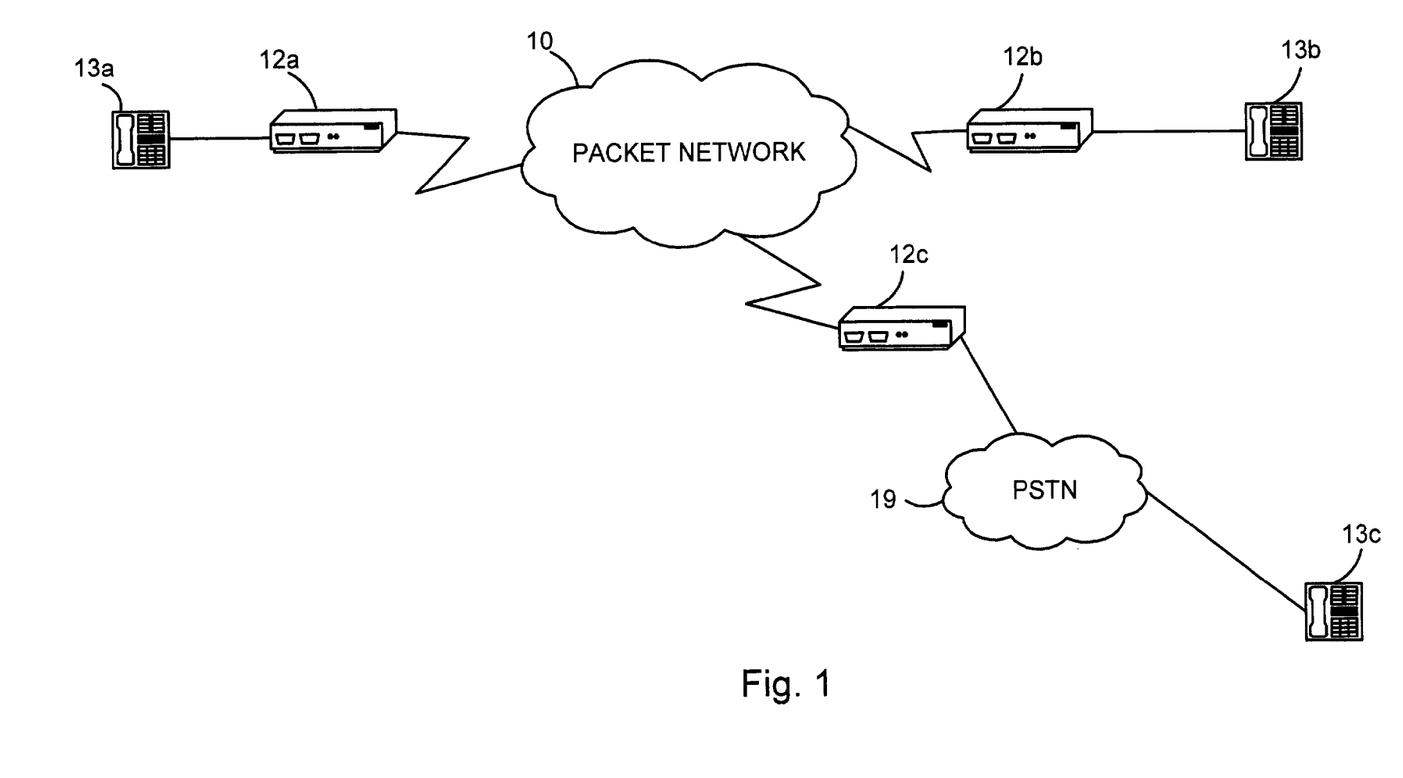
FIG. 1 is a functional block diagram representing a packet-based communication system according to an illustrative embodiment of the present invention.

An exemplary topology is shown in FIG. 1 with a packet-based network 10 providing a communication medium between telephony devices. Each network gateway 12a, 12b, 12c includes a signal processing system which provides an interface between the packet-based network 10 and a number of telephony devices. In the described exemplary embodiment, each network gateway 12a, 12b, 12c supports a telephony device 13a, 13b, 13c. Each network gateway 12a, 12b, 12c could support a variety of different telephony arrangements. By way of example, each network gateway might support any number of telephony devices, circuit-switched networks and/or packet-based networks including, among others, analog telephones, ethernet phones, fax machines, data modems, PSTN lines (Public Switching Telephone Network), ISDN lines (Integrated Services Digital Network), TI (Telephone Interface) systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (Time Division Multiple Access IS-13x), CDMA (Code Division Multiple Access IS-9x) or GSM (Global System for Mobile communications) for terrestrial wireless applications, or any other packet-based system.

Figure 1A:
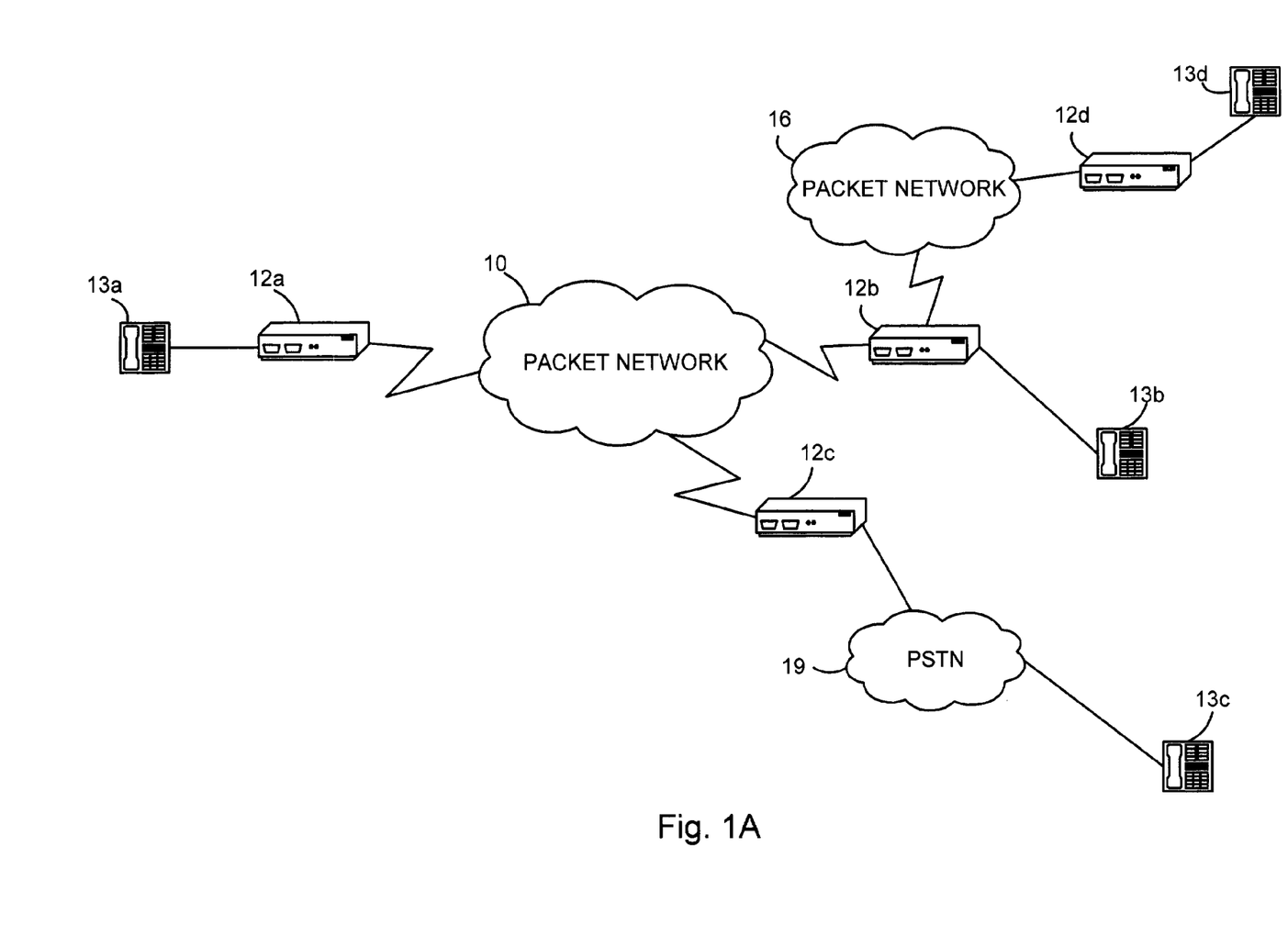
FIG. 1A is a functional block diagram representing a packet-based communication system according to an illustrative embodiment of the present invention.

Another exemplary topology is shown in FIG. 1A. The topology of FIG. 1A is similar to that of FIG. 1 but includes a second packet-based network 16 that is connected to packet-based network 10 and to telephony device 13b via network gateway 12b. The signal processing system of network gateway 12b provides an interface between packet-based network 10 and packet-based network 16 in addition to an interface between packet-based networks 10, 16 and telephony device 13b. Network gateway 12d includes a signal processing system which provides an interface between packet-based network 16 and telephony device 13d.

Figure 2:
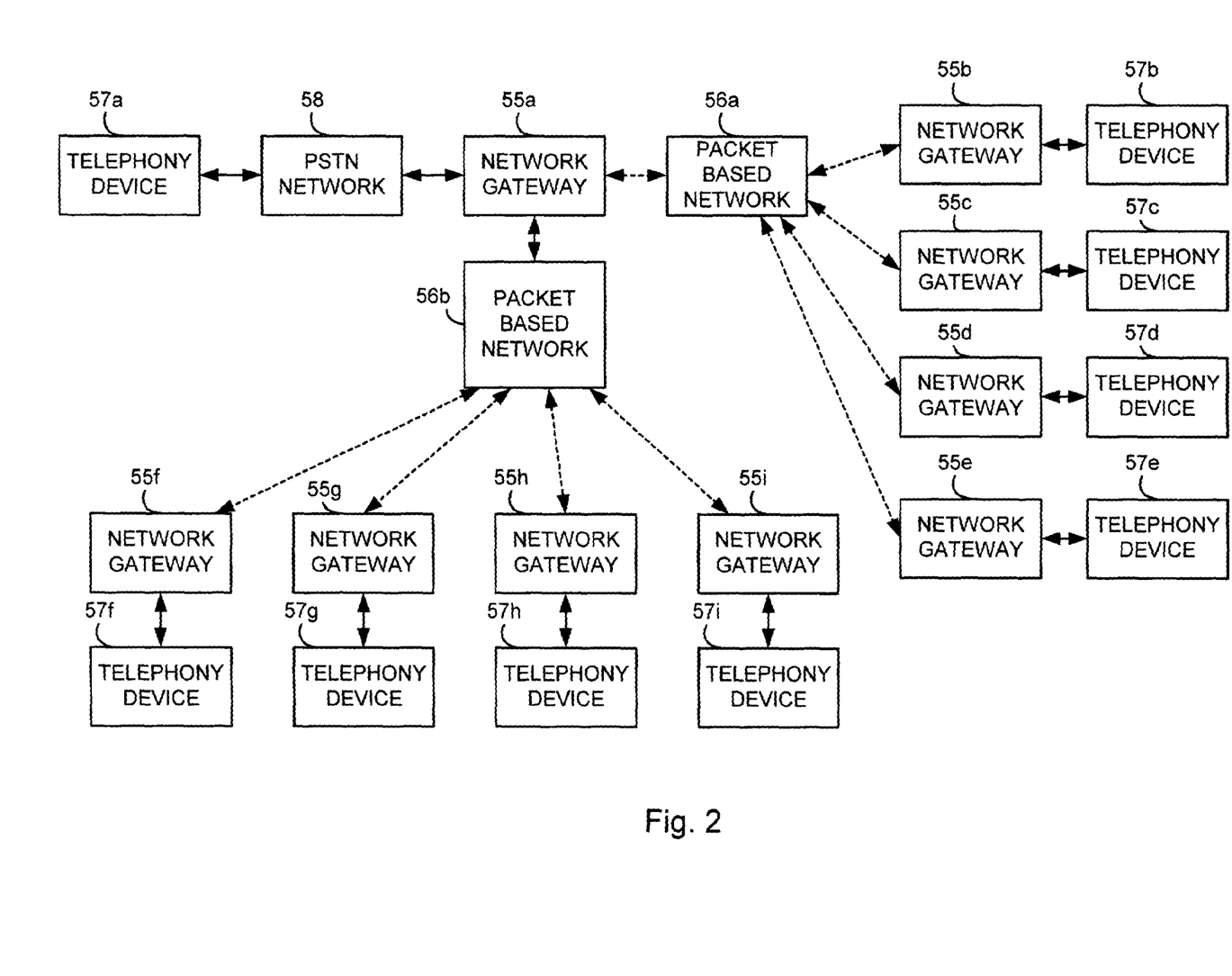
FIG. 2 is a functional block diagram representing a packet-based communication system according to an illustrative embodiment of the present invention.

FIG. 2 is a functional block diagram representing a communication system that enables the transmission of voice data over a packet-based system such as Voice over IP (VoIP, H.323), Voice over Frame Relay (VoFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Network gateway 55a supports the exchange of voice between a traditional circuit-switched network 58 and packet-based networks 56a and 56b. Network gateways 55b, 55c, 55d, 55e support the exchange of voice between packet-based network 56a and a number of telephony devices 57b, 57c, 57d, 57e. In addition, network gateways 55f, 55g, 55h, 55i support the exchange of voice between packet-based network 56b and telephony devices 57f, 57g, 57h, 57i. Telephony devices 57a, 57b, 57c, 57d, 57e, 57f, 57g, 57h, 57i can be any type of telephony device including telephones, facsimile machines and modems.

In general, voice packets are transmitted over a network synchronously. However, packets can arrive at the receiving end asynchronously due to a variety of factors. Irregularity in the time of arrival of transmitted packets, often referred to as "jitter," can jeopardize the quality of speech transmitted by the packet network. Since speech communication is a continuous process, each packet should be available at the receiving end in time for its usage (a packet is used by decoding its content and playing the decoded speech to the listener). Congestion due to inadequate bandwidth often leads to long delays in the delivery of time-sensitive packets. A problem arises, for example, if a few packets are delayed at a node of the packet network. At the receiving end, since the speech packets have not arrived, the listener will experience a discontinuity in speech. Moreover, when the packets finally arrive to their destination, they might arrive too late to be used, and will be dropped. In this case, the listener will lose some of the information. For voice data, packets that are lost or discarded result in gaps, silence, and clipping in real-time audio playback.

Figure 3:
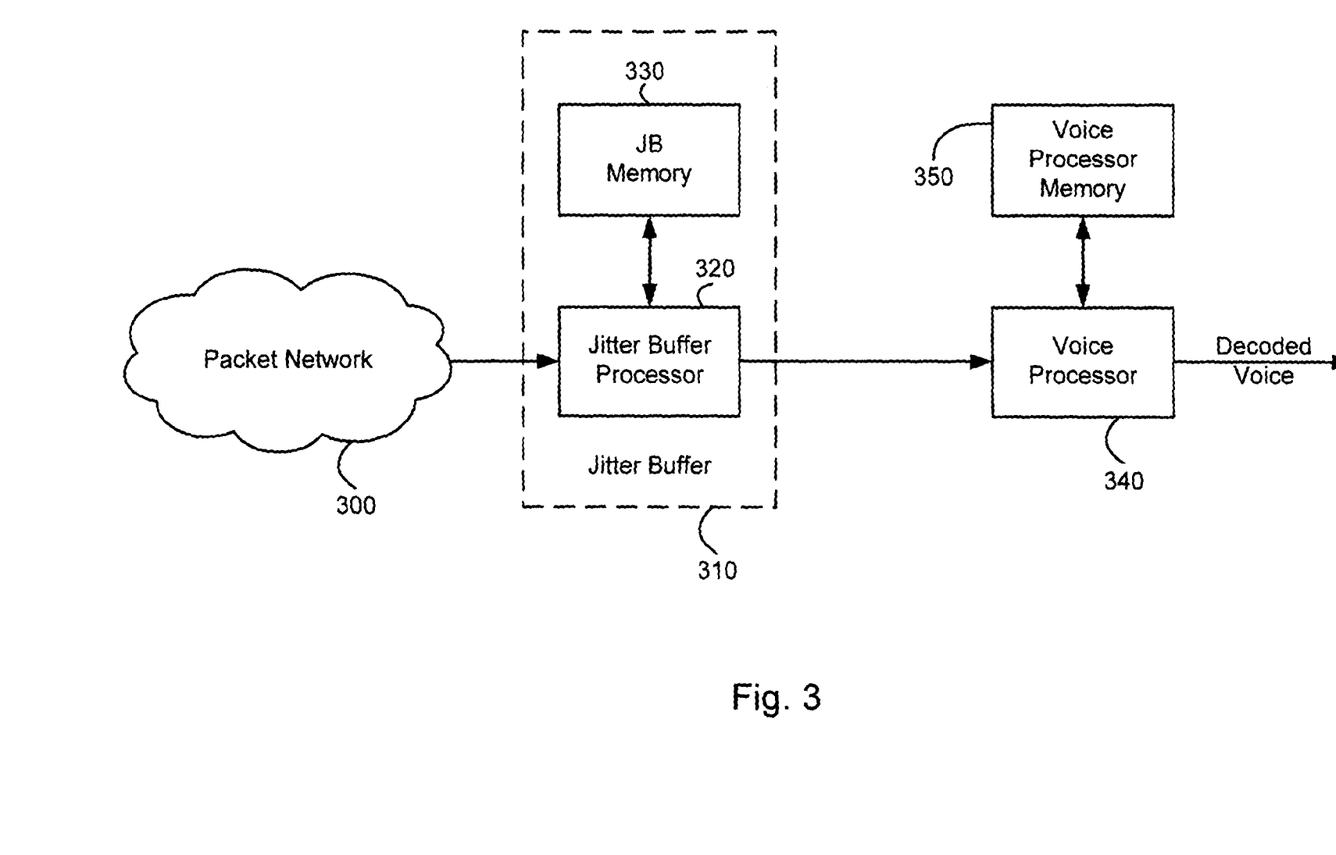
FIG. 3 is a functional block diagram representing a packet voice communication system according to an illustrative embodiment of the present invention.

FIG. 3 is a functional block diagram representing a packet voice communication system according to an illustrative embodiment of the present invention. Jitter buffer 310 serves to remove jitter in the stream of voice packets that is provided to the voice processor 340. Jitter buffer processor 320 of jitter buffer 310 receives voice packets from the packet network 300. The jitter buffer 310 acts as an intermediate buffer at the receiver end, allowing the packets to be played out of the jitter buffer 310 at a regular or standard predetermined replay rate by the voice processor 340 independent of the rate of arrival of the packets from the packet network 300. The jitter buffer processor 320 stores incoming voice packets in jitter buffer memory 330 before the packets are replayed. For example, in an exemplary embodiment wherein each packet represents 10 msec of video data, packets are transferred from the jitter buffer 310 to the voice processor once every 10 msec. In an illustrative embodiment of the present invention, the jitter buffer memory 330 is a relatively high-capacity memory unit. Also, jitter buffer memory 330 is illustratively a relatively low-speed (and therefore relatively inexpensive) memory unit. In an illustrative embodiment of the present invention, jitter buffer memory 330 is a Dynamic Random Access Memory (DRAM) unit. Additionally, in an illustrative embodiment of the present invention, jitter buffer processor 320 has a relatively low amount of processor power. In the illustrative embodiment shown in FIG. 3, the voice processor 340 pulls voice packets out of the jitter buffer 310 at a regular predetermined rate. If the jitter buffer 310 is empty, a null packet is transferred to the voice processor 340 and the listener will experience discontinuity or loss in the audio produced therefrom. If the number of delayed packets is less than the size of the jitter buffer memory 330, then the jitter buffer memory 330 will not become empty, and the listener will not experience speech discontinuity or loss. Null frames are also released after SD (silence identifier) packets (voice activity detection (VAD) active on far end) and when lost frames are detected.

The voice processor 340 decodes the voice packets to produce decoded voice. In an illustrative embodiment of the present invention, the voice processor 340 also performs a variety of other functions on the voice data, such as echo cancellation, automatic gain control, call discrimination, DTMF (dual-tone, multi-frequency) generation, comfort noise generation and/or lost frame recovery. In an exemplary embodiment of the present invention, the voice processor 340 is a relatively high-speed processor. In particular, in an exemplary embodiment, the voice processor 340 is a higher-speed processor than the jitter buffer processor 320. The voice processor 340 utilizes voice processor memory 350 for its processing tasks. In an exemplary embodiment of the present invention, the voice processor memory 350 is a relatively high-speed memory unit having a relatively moderate amount of storage capacity. In particular, in an exemplary embodiment, the voice processor memory 350 is a higher-speed memory unit than the jitter buffer memory 330 and the voice processor memory 350 has less storage capacity than jitter buffer memory 330.

According to an illustrative embodiment of the present invention, the jitter buffer 310 is external to the voice processor 340. In one embodiment of the present invention, the jitter buffer 310 is on a separate processor from the voice processor 340. In an alternative embodiment of the present invention, the jitter buffer 310 is on the same processor as voice processor 340, but operates in a different process or thread than the other voice processing functions.

According to one embodiment of the present invention, the external jitter buffer 310 places an indicator in each of the packets it holds, the indicator being indicative of how long the voice packet was held in the jitter buffer 310. In one embodiment, such an indicator is placed in the packet header of each voice packet buffered by the jitter buffer 310. In an exemplary embodiment, the indicator directly indicates a length of time the voice packet was held in the jitter buffer 310. In another embodiment, the indicator indicates the arrival time of the packet, that is, the time that the voice packet arrived at the external jitter buffer 310. In still another embodiment, the indicator indicates how many voice packets are held in the jitter buffer 310.

In yet another embodiment, the indicator indicates a time span represented by the packets held in the jitter buffer 310. That is, if the jitter buffer holds a plurality of packets, each packet represents a time amount of data, say 10 msec worth of data. Now, if one or more packets arrived at the jitter buffer 310 out of order, the jitter buffer 310 might not hold all of the packets that are between hypothetical packets X and Y in the packet sequence, i.e., the sequence in which the packets are intended to be played. In this case, in this illustrative embodiment of the present invention, the indicator indicates the span of time represented by the earliest packet (call it packet X) and latest packet (packet Y) in the packet sequence that are held in the jitter buffer 310, along with all of the packets between packets X and Y in the packet sequence, regardless of whether they are held in the jitter buffer 310. For example, say packets 1, 2, 3 and 5 of a packet sequence are held in the jitter buffer 310. If each packet represents 10 msec of video, the indicator would indicate 50 msec.

In an illustrative embodiment of the present invention, the voice processor 340 adjusts the rate at which it retrieves voice packets from the external jitter buffer 310 based upon a value of the indicator. The voice processor 340 retrieves voice packets at a faster rate if the holding times, that is, the length of time that voice packets are held in the jitter buffer, are relatively high. Conversely, the voice processor 340 retrieves voice packets at a slower rate if the holding times are relatively low, or if null packets indicate jitter buffer underflow. In the embodiment wherein the indicator indicates how many voice packets are held in the jitter buffer 310, the voice processor 340 retrieves voice packets at a faster rate if the jitter buffer 310 is relatively full and retrieves voice packets at a slower rate if the jitter buffer is relatively less full. In one embodiment, the voice processor 340 includes a jitter buffer manager that retrieves voice packets from the jitter buffer 310. In this embodiment, the jitter buffer manager adjusts the rate at which it retrieves voice packets from the external jitter buffer 310 based upon a value of the indicator. In an exemplary embodiment of the present invention, the jitter buffer 310 passes data to the voice processor 340 once per clock pulse. In such an embodiment, the voice processor 340 speeds up or slows down its clock depending on the value of the indicator.

Figure 4:
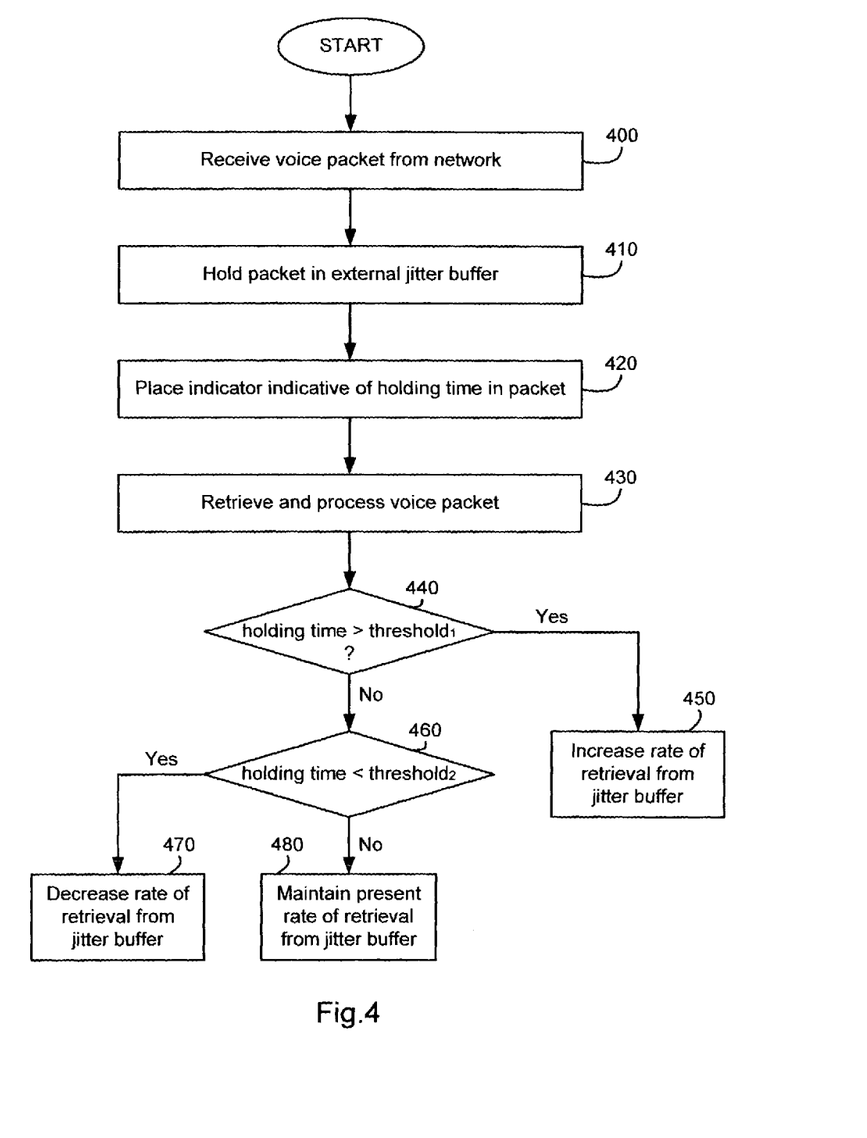
FIG. 4 is a flowchart representing a method of operating a packet voice communication system according to an illustrative embodiment of the present invention.

FIG. 4 is a flowchart representing a method of operating a packet voice communication system according to an exemplary embodiment of the present invention. At step 400, a voice packet is received from a network. At step 410, the voice packet is held in external jitter buffer 310 (FIG. 3). At step 420, an indicator is placed in the voice packet, the indicator being indicative of how long the voice packet was held in the external jitter buffer. At step 430, the voice packet, including the indicator, is retrieved from the external jitter buffer and processed by the voice processor. At decision box 440, it is determined if the holding time of the voice packet in the jitter buffer 310 was greater than a first threshold, threshold$_1$. At step 450, if the holding time of the voice packet in the jitter buffer 310 was greater than threshold$_1$, the rate of retrieval of packets from the jitter buffer 310 is increased. At decision box 460, if the holding time of the voice packet in the jitter buffer 310 was less than or equal to threshold$_1$, it is determined if the holding time of the voice packet in the jitter buffer 310 was less than a second threshold, thresholds, that is lower than threshold$_1$. At step 470, if the holding time of the voice packet in the jitter buffer 310 was less than threshold$_2$, the rate of retrieval of packets from the jitter buffer 310 is decreased. At step 480, if the holding time of the voice packet in the jitter buffer 310 was greater than or equal to threshold$_2$, the rate of retrieval of packets from jitter buffer 310 is maintained at its present level.

The method represented in FIG. 4 is merely illustrative. Many variations of the method of FIG. 4 are contemplated by the present invention. For example, in one embodiment, the indicator that is placed in the voice packet indicates how full or empty the jitter buffer 310 is. In one implementation of such an embodiment, a first threshold is maintained, wherein if the number of packets held in the jitter buffer is above the threshold, the rate of retrieval of packets from the jitter buffer is increased. A second threshold, lower than the first threshold, is maintained, wherein if the number of packets held in the jitter buffer is below the second threshold, the rate of retrieval of packets from the jitter buffer is decreased.

In another variation of the method of FIG. 4, any number of holding-time thresholds are maintained and the rate of retrieving packets from the jitter buffer is increased or decreased by varying amounts according to the holding time of packets in the buffer. For example, if the holding time is greater than a first, relatively high, threshold, the retrieval rate is increased by a first, relatively high, amount. If the holding time is lower than the first threshold but higher than a second threshold, the retrieval rate is increased by a second amount that is less than the first amount. If the holding time is lower than the second threshold but higher than a third threshold, the retrieval rate is maintained at its present rate. If the holding time is lower than the third threshold but higher than a fourth threshold, the retrieval rate is decreased by a first amount. If the holding time is lower than the fourth threshold but higher than a fifth threshold, the retrieval rate is increased by a second amount that is greater than the first amount. In another variation of the method of FIG. 4, rather than increasing, decreasing or maintaining the rate of retrieving packets from the jitter buffer 310 based on the holding time of packets in the jitter buffer 310, the rate of retrieval of packets from the jitter buffer 310 is set at one of a plurality of predetermined levels, according to the holding time. The higher the holding time, the higher the retrieval rate.

Figure 5:
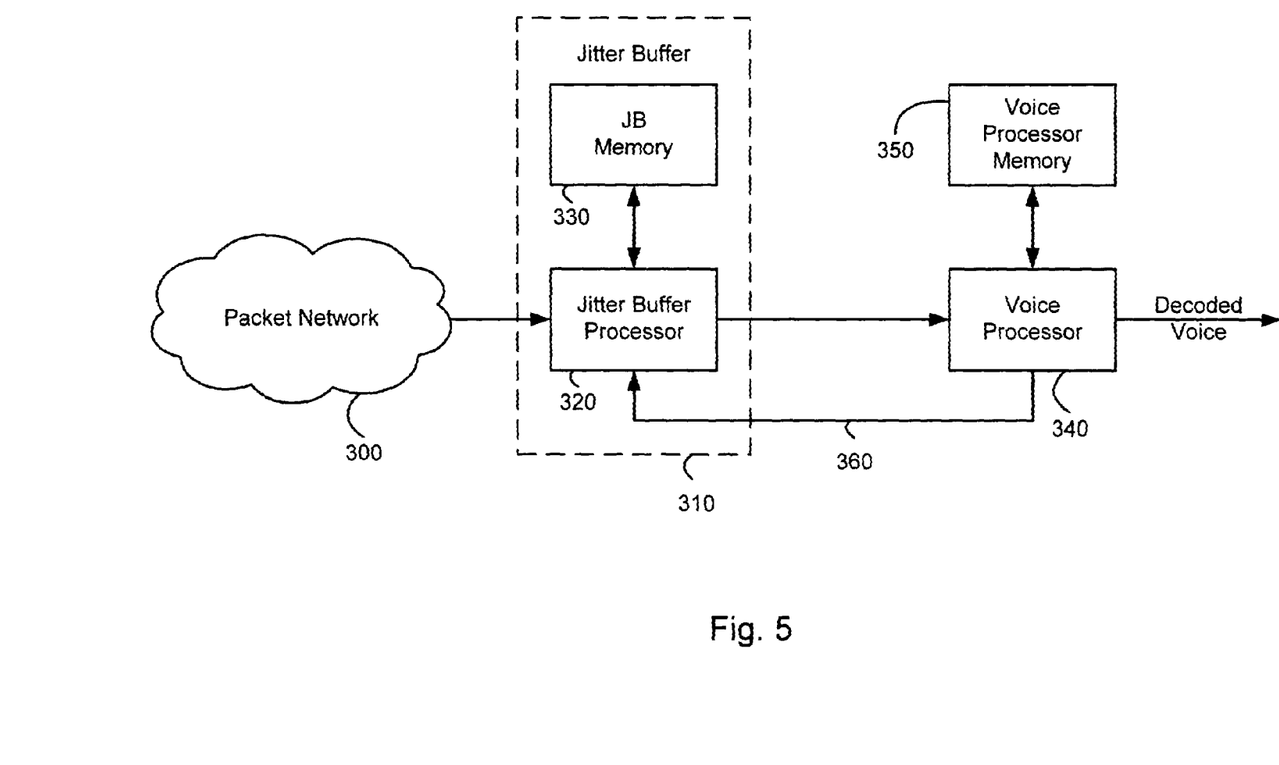
FIG. 5 is a functional block diagram representing a packet voice communication system according to an illustrative embodiment of the present invention.

FIG. 5 is a functional block diagram representing a packet voice communication system according to an illustrative embodiment of the present invention. The system of FIG. 5 is similar to the system of FIG. 3. However, in the system of FIG. 5, the jitter buffer 310 actively passes voice packets to the voice processor 340, while in the system of FIG. 3, voice packets are pulled out of the jitter buffer 310 by the voice processor 340. In an illustrative embodiment wherein the jitter buffer 310 actively pushes voice packets onto the voice processor, the voice processor includes a packet queue in which voice packets received from the jitter buffer 310 are stored prior to processing the voice packets. In an illustrative embodiment of the present invention, the packet queue resides in voice processor memory 350. The packet queue is illustratively a relatively small queue. In an exemplary embodiment, the packet queue has a capacity of 2-3 voice packets. The voice processor notifies the jitter buffer 310 of how many packets are in the packet queue via feedback line 360. In one embodiment, the voice processor 340 periodically notifies the jitter buffer 310 of how many voice packets are in the packet queue. In another embodiment, the voice processor 340 notifies the jitter buffer 310 of how many voice packets are in the packet queue every time the number of packets in the queue changes.

In an illustrative embodiment of the present invention, the external jitter buffer 310 adjusts the rate at which it provides voice packets to the voice processor 340 based upon how many voice packets are in the voice processor's packet queue. The voice processor 340 retrieves voice packets at a faster rate if there are relatively few voice packets in the voice processor's packet queue. Conversely, voice processor 340 retrieves voice packets at a slower rate if there are a relatively higher number of voice packets in the voice processor's packet queue. In an exemplary embodiment of the present invention, the jitter buffer 310 passes data to the voice processor 340 once per clock pulse. In such an embodiment, the voice processor 340 causes the clock that controls the jitter buffer 310 to speed up or slow down depending on the value of the indicator.

Figure 6:
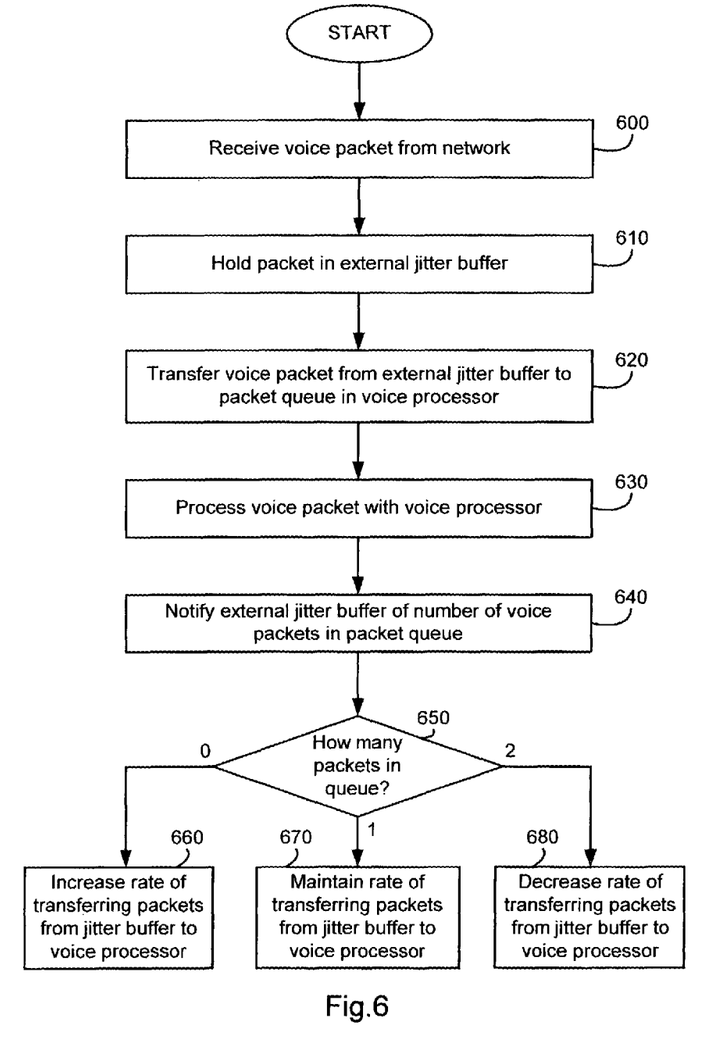
FIG. 6 is a flowchart representing a method of operating a packet voice communication system according to an illustrative embodiment of the present invention.

FIG. 6 is a flowchart representing a method of operating a packet voice communication system according to an illustrative embodiment of the present invention. For purposes of illustration, the example of FIG. 6 pertains to a voice processor having a packet queue that has a capacity of two voice packets. It will be appreciated that the voice processor's packet queue can be of substantially any size in accordance with the present invention. At step 600, a voice packet is received from a network. At step 610, the voice packet is held in external jitter buffer 310 (FIG. 5). At step 620, the voice packet is transferred from the external jitter buffer 310 to a packet queue in the voice processor 340 (FIG. 5). At step 630, the voice packet is processed by the voice processor 340. At step 640, the voice processor 340 notifies the jitter buffer processor 320 (FIG. 5)of how many packets are in the voice processor's packet queue. At decision box 650, depending on the number of voice packets in the voice processor's packet queue, one of three actions are taken. If there are not any voice packets in the packet queue, the rate of transferring packets from the jitter buffer 310 to the voice processor 340 is increased, as shown at step 660. If there is one voice packet in the packet queue, the rate of transferring packets from the jitter buffer 310 to the voice processor 340 is maintained at its present rate, as shown at step 670. If there are two voice packets in the packet queue, the rate of transferring packets from the jitter buffer 310 to the voice processor 340 is decreased, as shown at step 680.

The method represented in FIG. 6 is merely illustrative. Many variations of the method of FIG. 6 are contemplated by the present invention. For example, in one embodiment, a first threshold is maintained, wherein if the number of packets held in the voice processor's packet queue is below the threshold, the rate of retrieval of packets from the jitter buffer is increased. A second threshold, higher than the first threshold, is maintained, wherein if the number of packets held in the packet queue is above the second threshold, the rate of retrieval of packets from the jitter buffer is decreased. This embodiment is implementable with any size packet queue.

In another variation of the method of FIG. 6, wherein the voice processor's packet queue has a capacity of more than two voice packets, the rate of transferring packets from the jitter buffer to the voice processor is increased or decreased by varying amounts according to the number of voice packets in the packet queue. For example, in a system having a voice processor that has a packet queue having a capacity of four packets, if there are no voice packets in the packet queue, the transfer rate is increased by a first, relatively high, amount. If there is one voice packet in the packet queue, the transfer rate is increased by a second amount that is less than the first amount. If there are two voice packets in the packet queue, the transfer rate is maintained at its present rate. If there are three voice packets in the packet queue, the transfer rate is decreased by a first amount. If the packet queue is full (four packets), the transfer rate is decreased by a second amount that is greater than the first amount. In another variation of the method of FIG. 6, rather than increasing, decreasing or maintaining the rate of retrieving packets from the jitter buffer 310 (FIG. 5) based on the number of voice packets in the voice processor's packet queue, the rate of transferring packets from the jitter buffer 310 to the voice processor is set at one of a plurality of predetermined levels, according to the number of packets in the packet queue. The emptier the packet queue, the higher the transfer rate.

Although a preferred embodiment of the present invention has been described, it should not be construed to limit the scope of the appended claims. For example, the present invention is applicable to any real-time media, such as audio and video, in addition to the voice media illustratively described herein. Also, the invention is applicable to any type of transmitted data elements, such as frames, in addition to the application to packet data described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

The invention claimed is:

1. A packet voice communication system comprising:
   a jitter buffer external to a voice processor, where the jitter buffer is configured to receive voice packets from a network and to hold the received voice packets, wherein the jitter buffer is further configured to place an indicator in each of the received voice packets it holds, the indicator being indicative of how long the received voice packet was held in the jitter buffer; and
   the voice processor configured to retrieve voice packets from the jitter buffer and to process the retrieved voice packets, wherein the voice processor is configured to adjust a rate at which it retrieves voice packets from the jitter buffer based upon a value of the indicator.

2. The system of claim 1, wherein the voice processor comprises a jitter buffer manager configured to retrieve voice packets from the jitter buffer and wherein the jitter buffer manager is configured to adjust the rate at which it retrieves voice packets from the jitter buffer based upon the value of the indicator.

3. The system of claim 1, wherein the indicator indicates a length of time the voice packet was held in the jitter buffer.

4. The system of claim 1, wherein the indicator indicates a time that the voice packet arrived at the jitter buffer.

5. The system of claim 1, wherein the indicator indicates how many voice packets are held in the jitter buffer.

6. The system of claim 1, wherein the voice packets received by the jitter buffer are part of a packet sequence according to which the received voice packets are intended to be played out, and wherein the indicator indicates a span of time represented by earliest and latest voice packets of a sequence, that are held in the jitter buffer, and all voice packets in between the earliest and latest voice packets in the sequence, regardless of whether the in between voice packets are held in the jitter buffer.

7. The system of claim 1, wherein the jitter buffer is configured to place the indicator in a header of each received voice packet.

8. The system of claim 1, wherein the jitter buffer comprises a processor that is separate from the voice processor.

9. A method of operating a packet voice communication system, comprising:
   receiving a voice packet from a network;
   holding the voice packet in a jitter buffer external to a voice processor;
   placing an indicator in the voice packet, the indicator being indicative of how long the voice packet was held in the jitter buffer;
   retrieving the voice packet, including the indicator, from the jitter buffer;
   processing the voice packet with the voice processor; and
   adjusting a rate at which voice packets are retrieved from the jitter buffer based upon a value of the indicator.

10. The method of claim 9, wherein the indicator indicates a length of time the voice packet was held in the jitter buffer.

11. The method of claim 9, wherein the indicator indicates a time that the voice packet arrived at the jitter buffer.

12. The method of claim 9, wherein the indicator indicates how many voice packets are held in the jitter buffer.

13. The method of claim 9, wherein placing the indicator in the voice packet comprises placing the indicator in a header of the voice packet, the indicator being indicative of how long the voice packet was held in the jitter buffer.

14. The method of claim 9, wherein the jitter buffer comprises a processor that is separate from the voice processor.

15. A packet voice communication system comprising:
   a voice processor configured to receive voice packets in a packet queue and to process the voice packets; and
   a jitter buffer external to the voice processor, where the jitter buffer is configured to receive voice packets from a network, hold the received voice packets, and provide the received voice packets to the voice processor, wherein the voice processor is configured to notify the jitter buffer of how many voice packets are in the voice processor's packet queue.

16. The system of claim 15, wherein the jitter buffer is configured to adjust a rate at which it provides voice packets to the voice processor based upon how many voice packets are in the voice processor's packet queue.

17. The system of claim 15, wherein the jitter buffer comprises a processor that is separate from the voice processor.

18. A method of operating a packet voice communication system, comprising:
   receiving a voice packet from a network;
   holding the voice packet in a jitter buffer external to a voice processor;
   transferring the voice packet from the jitter buffer to a packet queue in the voice processor;
   processing the voice packet with the voice processor; and
   notifying the jitter buffer of how many voice packets are in the voice processor's packet queue.

19. The method of claim 18, wherein the method further comprises:
   adjusting a rate at which voice packets are transferred from the jitter buffer to the voice processor based upon how many voice packets are in the packet queue.

20. The method of claim 18, wherein the jitter buffer comprises a processor that is separate from the voice processor.

* * * * *